US008402386B2

(12) United States Patent
Hakiel et al.

(10) Patent No.: US 8,402,386 B2
(45) Date of Patent: Mar. 19, 2013

(54) METHOD AND APPARATUS FOR TWO-DIMENSIONAL SCROLLING IN A GRAPHICAL DISPLAY WINDOW

(75) Inventors: Simon Richard Hakiel, Landford (GB); Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 1972 days.

(21) Appl. No.: 11/071,396

(22) Filed: Mar. 3, 2005

(65) Prior Publication Data

US 2005/0210404 A1  Sep. 22, 2005

(30) Foreign Application Priority Data

Mar. 18, 2004 (GB) .................................. 0406056.2

(51) Int. Cl.
*G06F 3/048* (2006.01)
*G06F 3/041* (2006.01)
*G06F 3/033* (2006.01)
*H04N 7/15* (2006.01)

(52) U.S. Cl. ...... 715/786; 715/784; 715/785; 348/14.08

(58) Field of Classification Search .................. 715/786, 715/784, 785; 348/14.08
See application file for complete search history.

(56) References Cited

U.S. PATENT DOCUMENTS

| 5,196,838 A * | 3/1993 | Meier et al. ..................... 345/684 |
| 5,495,566 A * | 2/1996 | Kwatinetz ..................... 715/785 |
| 5,655,094 A * | 8/1997 | Cline et al. ..................... 715/786 |
| 5,864,330 A | 1/1999 | Haynes ......................... 715/856 |
| 2003/0052902 A1 | 3/2003 | Yu ................................. 345/684 |
| 2004/0021694 A1 | 2/2004 | Doar ............................. 715/784 |

FOREIGN PATENT DOCUMENTS

| JP | 04-263295 | 9/1992 |
| JP | 2001-255978 | 9/2001 |

OTHER PUBLICATIONS

IBM Technical Disclosure Bulletin, vol. 36 No. 04, Apr. 1993, pp. 399-403, "Scroll Control Box", R D DeWid.
IBM Technical Disclosure Bulletin, vol. 36 No. 08, Aug. 1993, pp. 627-628, "Scrolling a Square When the Extent of the Data is Undetermined", Henshaw et al.
IBM Technical Disclosure Bulletin, vol. 36 No. 09B, Sep. 1993, pp. 233-234, "Multi-Directional Scroll Method for Navigating in a Seemingly Boundless Two Dimensional Area", Johnson et al.
IBM Technical Disclosure Bulletin, vol. 37 No. 02A, Feb. 1994, pp. 67-68 "Scroll Box Window Control for Personal Computers", Broussard.

(Continued)

*Primary Examiner* — Jordany Nunez
(74) *Attorney, Agent, or Firm* — Winstead, P.C.

(57) ABSTRACT

A method and system for two-dimensional scrolling in a graphical display window (102) in a user interface are provided. A first scroll bar (110, 120) associated with a display window (102) is enabled to move data displayed in the window (102) relative to a first direction in the direction of the first scroll bar (110, 120). Responsive to user selection of a slide button (114, 124) in the first scroll bar (110, 120) with a pointer device and responsive to movement of the pointer device in a second direction, data displayed in the window (102) is moved relative to the second direction. The second direction is perpendicular to the first direction. A second scroll bar (120, 110) in the second direction may also be provided, wherein movement of the pointer device in the second direction with selection of the first scroll bar (110, 120) is represented by the position of a slide button (124, 114) in the second scroll bar (120, 110).

21 Claims, 5 Drawing Sheets

OTHER PUBLICATIONS

IBM Technical Disclosure Bulletin, vol. 37 No. 07, Jul. 1994, p. 585, "Two Dimensional Scroll Box", Kolar et al.

IBM Technical Disclosure Bulletin, vol. 37 No. 07, Jul. 1994, p. 575, "Two Dimensional Scrolling Extension", Kolar et al.

IBM Technical Disclosure Bulletin, vol. 37 No. 09, Sep. 1994, pp. 63-64, "Double Scroll Button on a Graphical Two-Way Scroll Window", Bleeker.

IBM Technical Disclosure Bulletin, vol. 37 No. 09, Sep. 1994, pp. 659-660, "Window Navigation using a Single Scroll Bar with Split Page Icon", Helmer et al.

Research Disclosure, p. 632, May 1998, Article No. 409119 "Using a Mouse to Scroll Through Documents", IBM.

Research Disclousre, p. 1144, Aug. 1999, Article No. 42499 "Interface Providing for 4-way Scrolling Using a Single Scrollbar in Graphical User Interface", IBM.

European Search Report from European Patent Office dated May 8, 2008.

"Double Scroll Button on a Graphical Two-Way Scroll Window," IBM Technical Disclosure Bulletin, Sep. 1, 1994, pp. 63-64.

"Multi-Directional Scroll Method for Navigating in a Seemingly Boundless Two Dimensional Area," IBM Technical Disclosure Bulletin, Sep. 1, 1993, pp. 233-234.

"Scroll Box Window Control for Personal Computers," IBM Technical Disclosure Bulletin, Feb. 1, 1994, pp. 67-68.

* cited by examiner

METHOD AND APPARATUS FOR TWO-DIMENSIONAL SCROLLING IN A GRAPHICAL DISPLAY WINDOW

This invention relates to the field of two-dimensional scrolling in a graphical display window. In particular, the invention relates to graphical display windows in data processing systems with vertical and horizontal scroll bars providing orientation in a data item.

User interfaces on data processing systems typically provide a screen for displaying data. A common format for presenting items of data on the screen is by rectangular graphical displays, which may be referred to as windows, panels or boxes. In this document, the term "window" is used for such rectangular displays.

A data item to be displayed may be larger than the viewable area of the window, so that a user only views part of the data item at any one time. The proportion of the data item that can be viewed can be changed by the user by zooming in and out of the data item or changing the viewable area position on the data item. Typically, when a user is working on a data item a large scale is needed in order to provide a detailed view of the data item in which case only a small portion of the whole data item may be viewed in a window.

If the data item is a word processing document, the user may need to scroll in only one dimension, namely vertically in the y direction. In this way, a word processing document can be scrolled from the beginning or top of the document to the end or the bottom. However, the user may wish to scroll in two dimensions to move horizontally as well as vertically around the data item. This is particularly common when the data item contains graphical information.

Scrolling is generally accomplished using scroll bars. A window is provided with a vertical scroll bar usually located on the right hand side of the window and a horizontal scroll bar usually located at the bottom of the window. In some data processing systems, each of the scroll bars only appears in the window when the data item exceeds the size of the window in that direction.

A user typically interacts with a scroll bar using a pointer device, such as a mouse, roller ball, touch pad, etc. In voice-enabled systems, a pointer device may be controlled by voice commands. The pointer device is represented on the screen by a cursor in the form of an arrow or other form of icon and enables the user to move around the screen of the user interface and to select and move objects displayed on the screen. Selecting an object using a pointer device is achieved by pointing at the desired object and depressing or "clicking" a button on the pointer device, tapping a touch pad, or by any other means appropriate to the type of pointer device. An object can be "dragged" on the screen by pointing the arrow cursor at it, selecting the object and moving the arrow cursor whilst having the object selected. For example, this can be done by holding down a button on a pointer device whilst moving the pointer device.

Each scroll bar usually has an outwardly pointing arrow at each end and a slide button or slider movable along a track between the two ends. To scroll in one dimension, the user interacts with the respective scroll bar by selecting one of the end arrows for incremental movement in the given direction, by selecting the track area between the desired end arrow and the slider, or by dragging the slider along the track. Some pointer devices also have wheels operated by the user's finger for scrolling movement once an object has been selected.

To scroll in two dimensions requires two separate interactions with two scroll bars; one interaction with the vertical scroll bar and one with the horizontal scroll bar.

Operation of two scroll bars is difficult and unwieldy for users without a high degree of manual dexterity in control of pointer devices. This is an increasingly important consideration for usability of products. Also, in voice-enabled systems where each pointer device operation involves a set of commands, the number of commands needed must be kept to a minimum.

Problems are also encountered when rescrolling is required and the user does not know where the boundaries of the required area for viewing are in relation to the whole data item. In practice, a user wastes valuable time wandering back and forth using both sets of scroll bars to achieve the desired positioning.

A prior art method of two-dimensional scrolling is described in U.S. Pat. No. 5,864,330 in which a two-dimension scroll icon is provided, in a home position, at the intersection between the vertical and horizontal scroll bars. To scroll data in the client area of the display window, the scroll icon is dragged in the desired direction. The scroll icon can be moved in any direction. This prior art method has the disadvantage that it requires an additional scroll icon to be added to the user display. This requires users to learn a new skill in operating the scroll icon.

It is an aim of the present invention to provide two-dimensional scrolling in a graphical display window by enhancing existing scroll bars by providing two-dimensional operation. This is achieved by linking the operation of the horizontal and vertical scroll bars.

According to a first aspect of the present invention there is provided a method for two-dimensional scrolling in a graphical display window, comprising: providing a scroll bar associated with a display window enabled to move data displayed in the window relative to a first direction; responsive to user selection of the scroll bar with a pointer device and responsive to movement of the pointer device in a second direction, moving data displayed in the window relative to the second direction.

Preferably, the first direction is the direction of the scroll bar and the second direction is perpendicular to the first direction. The user selection of the scroll bar may be by selection of a slide button on the scroll bar.

The method may include representing the position of the display widow in the first direction in a data item being viewed by the position of the slide button in the scroll bar. The method may also include providing a second scroll bar in the second direction and wherein movement of the pointer device in the second direction with user selection of the first scroll bar may be represented by the position of a slide button in the second scroll bar.

The method may include optionally activating the scroll bar to be responsive to movement in the second direction. In this way the feature of two-dimensional scrolling may be optionally activated by a user. Alternatively, the feature of two-dimensional scrolling may be continuously activated.

The user selection of the scroll bar for activating movement in the second direction may be different to the user section of the scroll bar for activating movement in the first direction. For example, different buttons may be used on a pointer device when selecting a slide button of the scroll bar.

The method may include sending movement messages of a pointer device associated with a slider control to a first scroll bar owning the slider control and to a second scroll bar. The step of sending movement messages may include sending them to an owning window control to route them to the first and second scroll bars for processing.

According to a second aspect of the present invention there is provided a system for two-dimensional scrolling in a graphical display window in a user interface, comprising: a scroll bar associated with a display window enabled to move data displayed in the window relative to a first direction; a pointer device for selecting objects in the user interface; means for selecting the scroll bar with the pointer device; and means for moving the data displayed in the window relative to a second direction responsive to movement of the pointer device in the second direction.

The first direction may be the direction of the scroll bar and the second direction may be perpendicular to the first direction. The means for selecting the scroll bar may be a slide button on the scroll bar.

The position of the display widow in the first direction in a data item being viewed may be represented the by the position of the slide button in the scroll bar. The system may include a second scroll bar in the second direction, wherein movement of the pointer device in the second direction with selection of the first scroll bar may be represented by the position of a slide button in the second scroll bar.

Means may be provided for optionally activating the scroll bar to be responsive to movement in the second direction. Means for selecting the scroll bar for activating movement in the second direction may also be distinct from means for selecting the scroll bar for activating movement in the first direction.

The system may include means for interpreting pointer device movement in the first and second directions and means for sending corresponding movement signals to the display window. This may be by the system including means for sending movement messages of a pointer device associated with a slider control to a first scroll bar owning the slider control and to a second scroll bar. The means for sending movement messages may send the movement messages to an owning window control to route them to the first and second scroll bars for processing.

According to a third aspect of the present invention there is provided a computer program product stored on a computer readable storage medium, comprising computer readable storage code means for performing the steps of: receiving a pointer device movement message relating to selection of a scroll bar control; interpreting the message in both x and y directions; and sending the appropriate movement signals to move a data item being displayed in each of the x and y directions.

Embodiments of the present invention will now be described, by way of examples only, with reference to the accompanying drawings in which.

Figure 1:
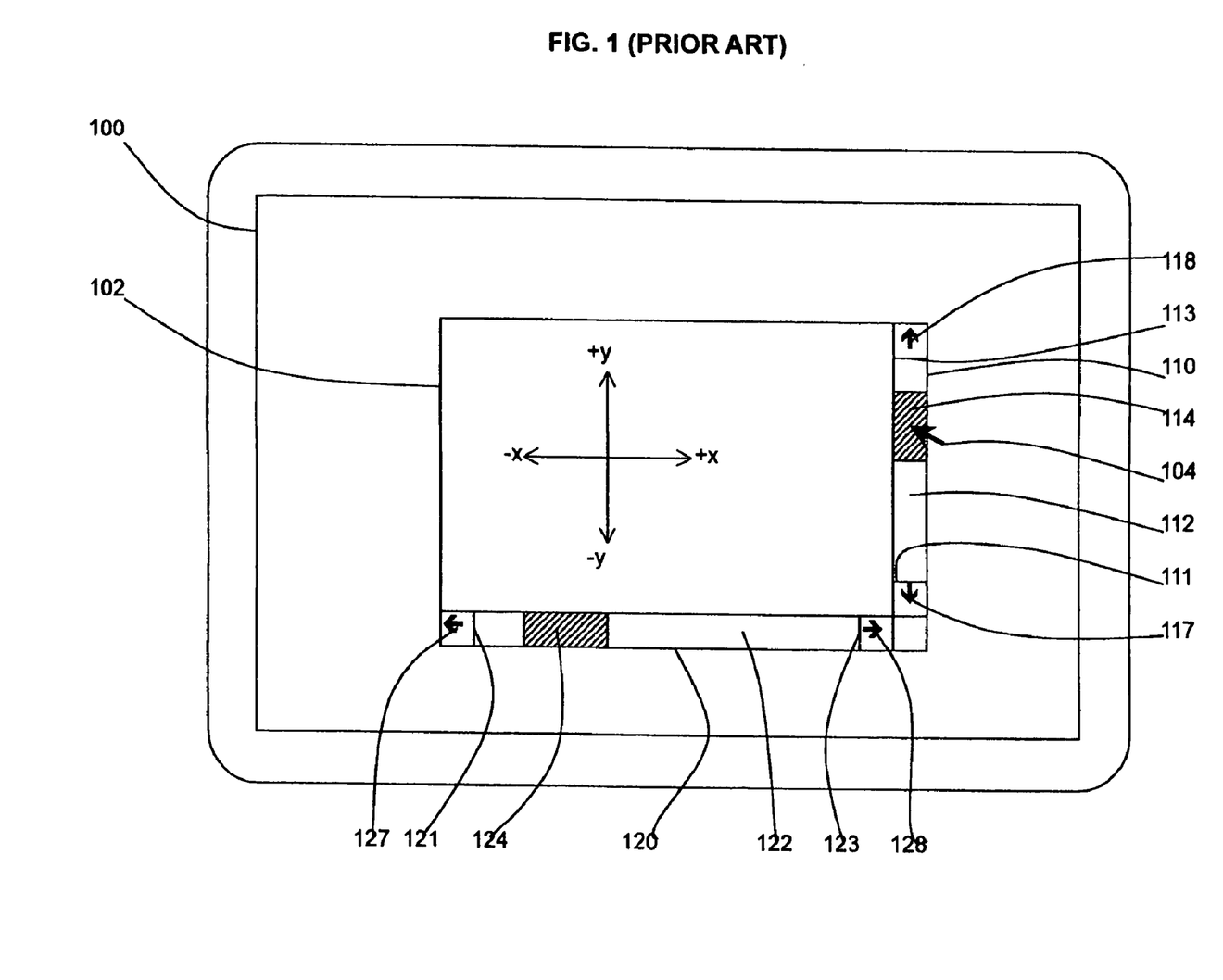
FIG. 1 is a diagram showing a graphical display window as known from the prior art.

FIG. 1 shows a user interface of a data processing system in the form of a screen 100 on which a window 102 is displayed. The window 102 has a vertical scroll bar 110 and a horizontal scroll bar 120.

A scroll bar control 112, 122 is provided on each scroll bar 110, 120. The control 112, 122 indicates to the user that more of the data item is available beyond the current extent (horizontal and/or vertical) of the view in the window 102. The horizontal and vertical scroll bar controls 112, 122 each contain a slider 114, 124, which enables the user to manipulate the view to make visible the user desired part of the data item.

A slider 114, 124 occupies a proportion of the scroll bar control 112, 122 commensurate with the ratio of the data item visible to that which is not currently visible. The location of the slider 114, 124 within the scroll bar control 112, 122 indicates the placement of the view relative to the extent of the data item (left to right, or, bottom to top, respectively).

In prior art systems, a slider 114 in a vertical scroll bar 110 can be moved up or down in only one direction between a lower bound 111 and an upper bound 113. Conventionally, the lower bound 111 is the bottom or maximum position and the upper bound 113 is the top or minimum position. The slider 114 moves in a +y or a −y direction only.

Similarly, a slider 124 in a horizontal scroll bar 120 can be moved left or right in only one direction between a left bound 121 and a right bound 123. Conventionally, the left bound 121 is the left-most or zero position and the right bound 123 is the right-most or maximum position. The slider 124 moves in a +x or a −x direction only.

In prior art systems, the user can manipulate the view by dragging a slider 114, 124 to some position in the scroll bar control 112, 122. An arrow cursor 104 on the screen 100 is controlled by a pointer device operated by the user. The user manipulates the pointer device to move the arrow cursor 104 to point to and select a slider 114, 124. The selection of the slider 114, 124 is activated, for example, by depressing a button on the pointer device, and the pointer device is moved by the user to drag the slider 114, 124 along the scroll bar control 112, 122. In this way the user can move the slider 114, 124 to a desired position between the end bounds 111, 113 or 121, 123 of the scroll bars 110, 120 respectively.

As a slider 114, 124, as known in the prior art, is operating within a one dimensional object, the only permitted movement for the data item as controlled by the pointing device is in the +/−x direction for the horizontal scroll bar 120 and the +/−y direction for the vertical scroll bar 110.

Scroll bars 110, 120 with one dimensional operation allow noisy input. This means that if a pointer device is operated in an inexact fashion, the operation is still carried out. This enables a user to carry out an operation quickly without requiring exact manual skill. For example, a user may point the arrow cursor 104 controlled by the pointer device at the slider 114 in a vertical scroll bar 110. The user selects and drags the slider 114 downwards in the −y direction in the scroll bar control 112. However, if the user drags the arrow cursor 104 downwards such that it moves off the slider 114 and the scroll bar control 112 whilst the slider 114 is selected, the operation of vertical downward scrolling is continued until the pointer device is released. In this way, the arrow cursor 104 can move to the right or left (+/−x directions) without affecting the operation as well as in the downward direction. Any movement of the pointer device in a direction apart from that required by the slider 114 is ignored. Noisy input can therefore be translated into linear output.

A user can also operate the one dimensional movement of scroll bars 110, 120 by using end tabs 117, 118 and 127, 128. Each scroll bar 110, 120 usually has an end tab 117, 118 and 127, 128 with an outwardly pointing arrow at each end. To scroll in one dimension, the user interacts with the respective scroll bar by selecting one of the end tabs 117, 118, 127, 128 for incremental movement in the given direction. The incremental movement can be in units of a row/column or in grosser units e.g. page sized or the horizontal view dimension. This increment is usually established by the application.

The major user of a scroll bar is to position the viewable area over a larger data item when only fractional areas of the data item can be viewed.

Figure 2:
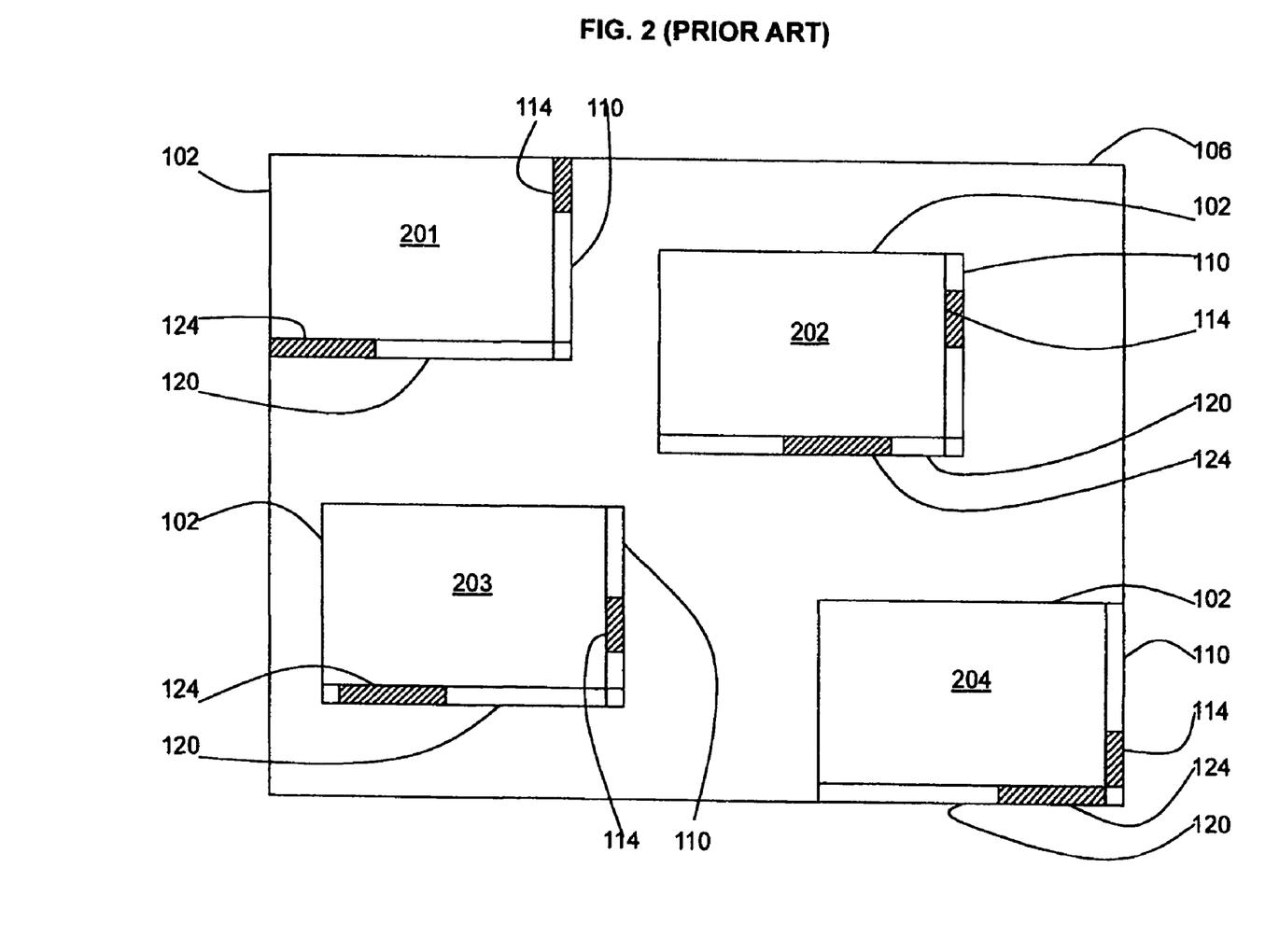
FIG. 2 is a diagram showing a data item with sections to be displayed in a graphical display window of FIG. 1.

FIG. 2 shows a data item 106. The complete data item 106 is too large to be viewed in its entirety on a screen 100 as shown in FIG. 1 whilst allowing sufficient detail for a user to work on the data item 106. Therefore, the data item 106 must be viewed one section of viewable area at a time. A viewable area is displayed in a window 102 on a screen as shown in FIG. 1.

FIG. 2 shows four sections 201, 202, 203, 204 of the data item 106 as each of them would be displayed in a window 102. Scroll bars 110, 120 with sliders 114, 124 are shown for each section 201, 202, 203, 204 showing how the sliders 114, 124 represent the position of the section shown in a window 102 in relation to the entire data item 106. For example, a first section 201 is the top left hand corner section of the data item 106. If this section 201 is the section viewed in a window 102, the vertical slider 114 would be at the top bound of the vertical scroll bar 110 and the horizontal slider 124 would be at the left bound of the horizontal scroll bar 120.

The scroll bars 110, 120 are used to control the selection of the section of the data item 106 which is viewable in the window 102.

Figure 3:
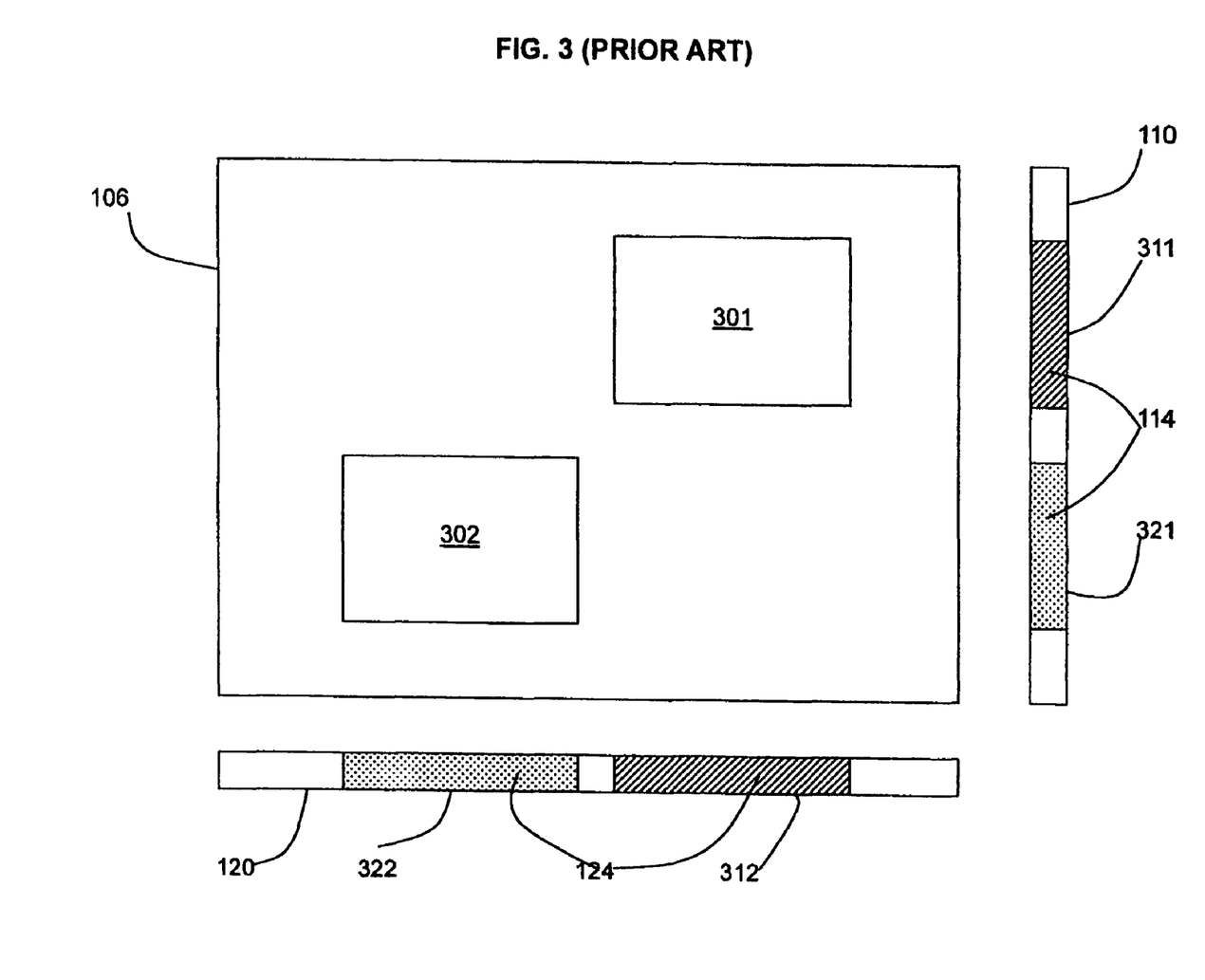
FIG. 3 is a diagram showing a data item with sections to be displayed in a graphical display window of FIG. 1 with vertical and horizontal scroll bars showing the position of the viewable section.

FIG. 3 shows a data item 106 with scroll bars 110, 120 of a window 102 (see FIG. 1) shown adjacent the whole data item 106 for the purposes of illustration. A first section 301 is displayed in a window. When the first section 301 is displayed, the vertical scroll bar 110 has a slider 114 in first position 311 and the horizontal scroll bar 120 has a slider 124 in first position 312.

The user wishes to view a second section 302 of the data item 106. Therefore, the viewable area must be moved from the position over the first section 301 to a position over the second section 302. The slider 114 of the vertical scroll bar 110 is moved to a second position 321 and the slider 124 of the horizontal scroll bar 120 is moved to a second position 322.

Using one dimensional scroll bars as known from the prior art, this movement involves several operations, as follows:
1. The slider 114 of the vertical scroll bar 110 is selected by the pointer device, for example, by positioning the arrow cursor over the slider 114 and holding down a button on the pointer device.
2. Moving the pointer device in the −y direction from the first position 311 to the second position 321.
3. Releasing the slider 114 of the vertical scroll bar 110 by releasing the button on the pointer device.
4. Repositioning the pointer device so that the arrow cursor points to the slider 124 of the horizontal scroll bar 120.
5. Selecting the slider 124 of the horizontal scroll bar 120 by the pointer device by positioning the arrow cursor over the slider 124 and holding down a button on the pointer device.
6. Moving the pointer device in the −x direction from the first position 312 to the second position 322.
7. Releasing the slider 124 of the horizontal scroll bar 120 by releasing the button on the pointer device.

The described system is now described which provides two-dimensional scrolling using existing scroll bars 110, 120. The sequence of steps given above required for positioning can be greatly reduced by enhancing scroll bars with two-dimensional operation. This is achieved by linking the operation of the vertical and horizontal scroll bars 110, 120.

The described system enables a user to operate a single scroll bar to position the viewable area in a data item. A vertical scroll bar 110 interacts with a horizontal scroll bar 120 by means of its slider 114. The converse also applies in that a horizontal scroll bar 120 interacts with a vertical scroll bar 110 via its slider 124.

When a pointing device has selected a slider 114, 124 in a first of the vertical or horizontal directions, movement in the other of the horizontal or vertical directions results in corresponding movement of the other slider 124, 114.

Movement of a vertical scroll bar slider 114 will respond to a pointing device movement to the left (the −x direction) or to the right (the +x direction). The response to the pointer device movement is to move the slider 124 of the linked horizontal scroll bar 120 as if the horizontal scroll bar slider 124 had been selected and moved by the pointer device.

In the same way, movement of a horizontal scroll bar slider 124 will respond to a pointing device movement up (the +y direction) or down (the −y direction). The response to the pointer device movement is to move the slider 114 of the linked vertical scroll bar 110 as if the vertical scroll bar slider 114 had been selected and moved by the pointer device.

If required, only one scroll bar can be provided and all movement is achieved by selecting the single slider and moving the pointer device in the required direction. However, the position in the data item of the viewable area will only be shown in the direction of the single scroll bar.

The linking of the vertical and horizontal scroll bars 110, 120 to provide two-dimensional movement can be optionally selected or can be continuously activated. The optional selection of the two-dimensional movement can be by selecting a button on the pointer device, by selecting an icon on the screen, by setting a preference in a tool bar, or by other means.

In one embodiment, a pointer device may have two buttons, a preferred button and a non-preferred button such as the left and right buttons on a mouse. One dimensional, linear movement is provided when a slider is selected using a preferred button and two-dimensional movement is provided when a slider is selected using a non-preferred button.

In another embodiment, other available buttons could be used on a pointer device to control the granularity of the movement required to activate the linked scroll bar movement. For example, two buttons on a pointer device could be held down or a left button could be held whilst clicking with a right button to activate the second dimension of movement.

The described system does not alter the operations of selecting end tabs 117, 118 and 127, 128 or the selecting of the area between the end tabs and a slider 114, 124 in order to activate incremental scrolling of a data item.

Figure 4:
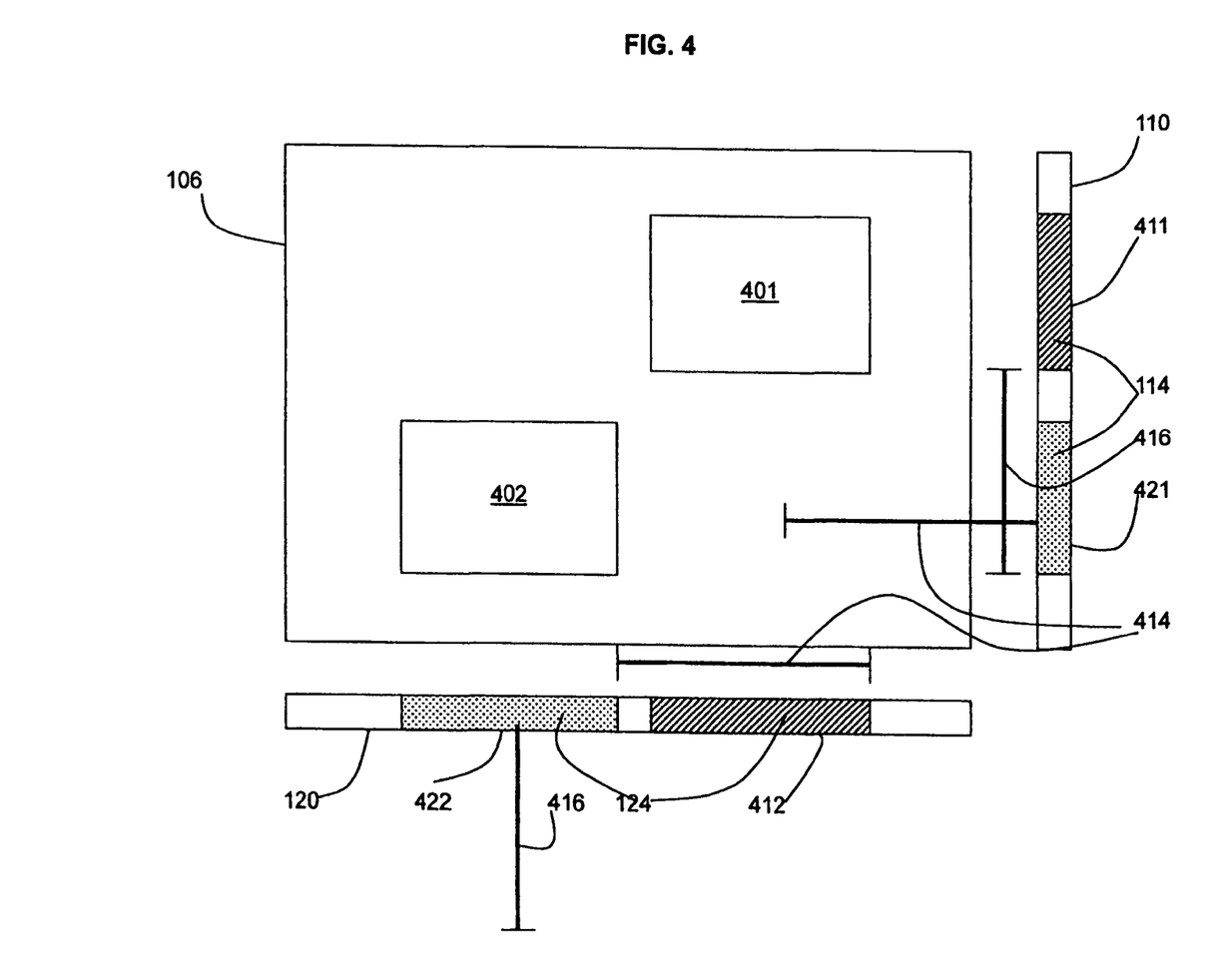
FIG. 4 is a diagram showing a data item corresponding to that of FIG. 3 by with vertical and horizontal scroll bars in accordance with the present invention.

Referring to FIG. 4, a data item 106 is shown corresponding to that shown in FIG. 3. The whole data item 106 is shown with scroll bars 110, 120 of a window 102 shown adjacent the whole data item 106 for the purposes of illustration. A first section 401 is displayed in a window. When the first section 401 is displayed, the vertical scroll bar 110 has a slider 114 in first position 411 and the horizontal scroll bar 120 has a slider 124 in first position 412.

The user wishes to view a second section 402 of the data item 106. Therefore, the viewable area must be moved from the position over the first section 401 to a position over the second section 402. The slider 114 of the vertical scroll bar 110 must move to a second position 421 and the slider 124 of the horizontal scroll bar 120 must move to a second position 422.

Using the two-dimensional scrolling of the described system, this movement can be achieved using only the vertical scroll bar 110 by the following operations:
1. The slider 114 of the vertical scroll bar 110 is selected by the pointer device, for example, by positioning the arrow cursor over the slider 114 and holding down a button on the pointer device.
2. Moving the pointer device downwards in the −y direction from the first position 411 to the second position 421.
3. Whilst continuing to have the slider 114 of the vertical scroll bar 110 selected, moving the pointer device a distance 414 to the left in the −x direction. The distance 414 corresponds to the distance the slider 124 of the horizontal scroll bar must move from the first position 412 and the second position 422.
4. Releasing the slider 114 of the vertical scroll bar 110 by releasing the button on the pointer device.

Whilst the pointing device is moving the selected slider 114 of the vertical scroll bar 110 in the −y direction to the second position 421, the linked slider 124 of the horizontal scroll bar 120 stays in its initial first position 412. However, when the pointing device moves in the −x direction, the selected slider 114 does not move but the linked slider 124 moves in the −x direction an amount corresponding to the movement of the pointer device.

Although the slider 124 of the horizontal scroll bar 120 is not selected, the slider 124 moves position in the horizontal scroll bar 120 as step 3 above is carried out. This ensures that the slider 124 remains representative of the position of the viewable area in the whole data item.

The same movement can be achieved using only the horizontal scroll bar 120 by the following operations:
1. The slider 124 of the horizontal scroll bar 120 is selected by the pointer device, for example, by positioning the arrow cursor over the slider 124 and holding down a button on the pointer device.
2. Moving the pointer device to the left in the −x direction from the first position 412 to the second position 422.
3. Whilst continuing to have the slider 124 of the horizontal scroll bar 120 selected, moving the pointer device a distance 416 downwards in the −y direction. The distance 416 corresponds to the distance the slider 114 of the vertical scroll bar 110 must move from the first position 411 and the second position 421.
4. Releasing the slider 124 of the horizontal scroll bar 120 by releasing the button on the pointer device.

Whilst the pointing device is moving the selected slider 124 of the horizontal scroll bar 120 in the −x direction to the second position 422, the linked slider 114 of the vertical scroll bar 110 stays in its initial first position 411. However, when the pointing device moves in the −y direction, the selected slider 124 does not move but the linked slider 114 moves in the −y direction an amount corresponding to the movement of the pointer device.

Although the slider 114 of the vertical scroll bar 110 is not selected, the slider 114 moves position in the vertical scroll bar 110 as step 3 above is carried out. This ensures that the slider 114 remains representative of the position of the viewable area in the whole data item.

Movement of the pointer device does not need to be made in discreet steps in a +/−x direction and a +/−y direction. The movement can be in a diagonal direction and this is resolved into x and y movements applied to the appropriate sliders 124, 114 of the horizontal and vertical scroll bars 120, 110.

Figure 5:
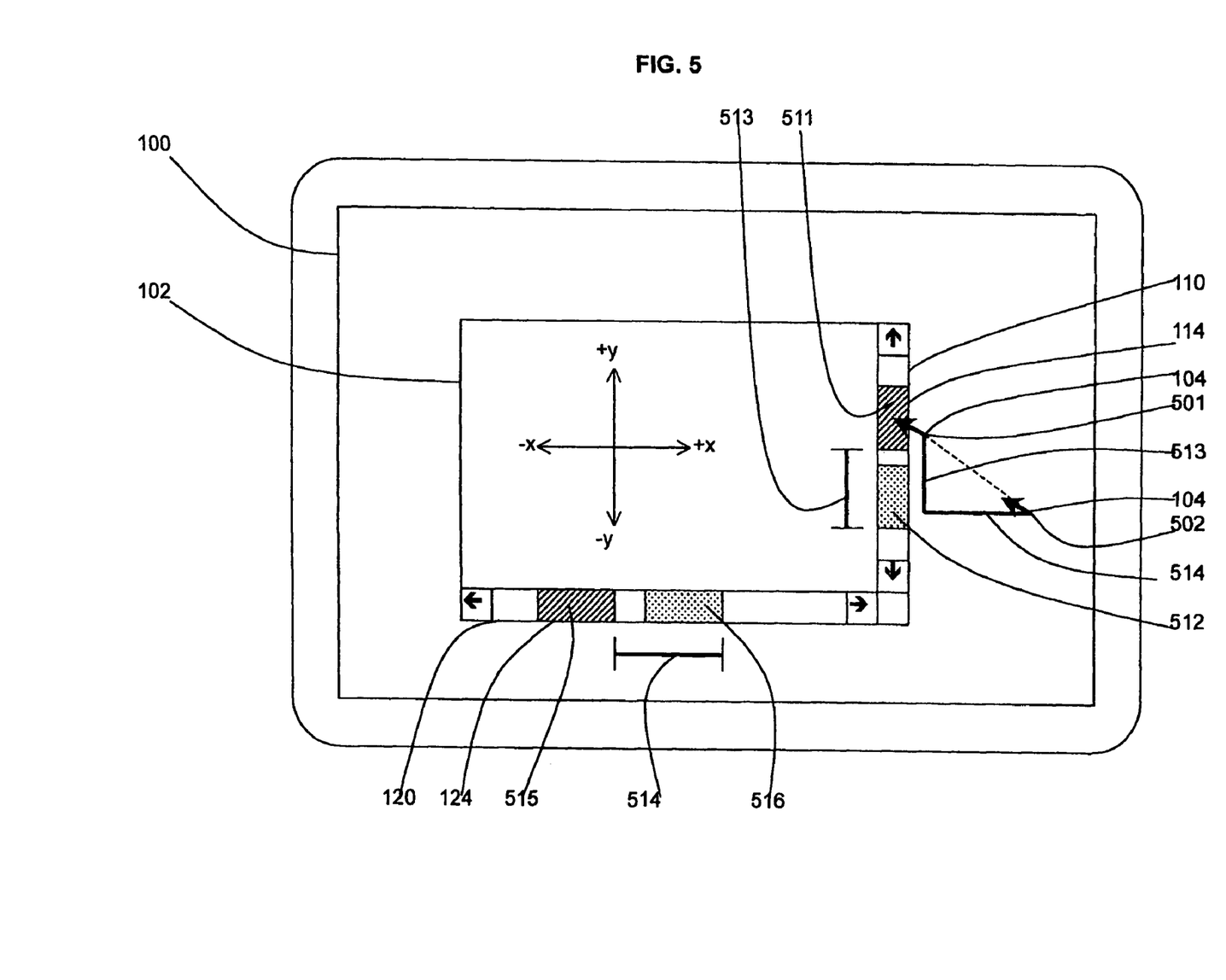
FIG. 5 is a diagram showing a graphical display window in accordance with the present invention.

FIG. 5 shows a screen 100 as shown in FIG. 1, with a window 102 showing a viewable area of a data item. A arrow cursor 104 is shown in a first position 501 pointing to the slider 114 of the vertical scroll bar 110. The slider 114 is in a first position 511 in the vertical scroll bar 110.

The arrow cursor 104 is moved to a second position 502 which is a distance 513 in the −y direction and a distance 514 in the +x direction. The slider 114 of the vertical scroll bar 110 moves to a second position 512 a distance 513 from the first position 511. The slider 124 of the horizontal scroll bar 120 moves from a first position 515 to a second position 516 which is a distance 514 from the first position 515. The viewable area of the data item is changed accordingly as the sliders 114, 124 move.

The implementation of the linking of the scroll bars 110, 120 is by interpretation of pointer device messages in both x and y directions, flattening them and sending the appropriate movement signal directly to the relevant slider 114, 124. Any movement of a pointer device in the x direction interpreted from a pointer device message is sent to the slider 124 of the horizontal scroll bar 120. Any movement of a pointer device in the y direction interpreted from a pointer device message is sent to the slider 114 of the vertical scroll bar 110. These messages are interpreted by both scroll bars 110, 120 regardless of which of the sliders 114, 124 has been selected.

In a typical windowing environment, for example, such as that provided by Microsoft Windows (trade mark of Microsoft, Inc.) or GNOME (GNU Network Model Environment) provided by the Free Software Foundation, visual items, called controls, are in a hierarchy.

In the described system, a window control contains scroll bar controls and scroll bar controls contain a slider control. In general, pointer device movements (such as mouse movements) are sent to the control (window, scroll bar, slider etc.) that is currently associated with that device. Consequently, when the arrow cursor 104 is associated with slider 114 or positioned on end markers 117,118, the pointer device movement messages are sent to the owning scroll bar 110 by the windowing software.

In prior art, movement of the arrow cursor 104 by the pointer device when associated with the slider 114 in the vertical scroll bar 110 sends movement messages in the +/−y direction which are processed and also in the +/−x direction which are ignored. The described system extends the processing so that the +/−x movements for the arrow cursor 104 as controlled by the pointer device when associated with the slider 114 in the vertical scroll bar 110 are not ignored but treated as movements for the associated slider 124 in horizontal scroll bar 120. Similarly, +/−y movements for of the arrow cursor 104 as controlled by the pointer device associated with the slider 124 in the horizontal scroll bar 120 cause movements for the slider 114 of the vertical scroll bar 110.

As both scroll bars 110,120 are associated through the owning window 102, one implementation of the described system is for +/−x movements when received by the slider 114 of the vertical scroll bar 110 to generate pointer device movement messages directed to the slider 124 of the horizontal scroll bar 120. Similarly, +/−y movements of slider 124 in the horizontal scroll bar 120 are sent to the slider 114 of the vertical scroll bar 110. This is done by formatting up the relevant movement flows and sending them to the owning window 102 which then routes them to the relevant scroll bars 110,120 where they are processed as if they came directly from the pointer device.

In one embodiment, the amount of latitude in moving a pointer device to activate the second dimensional movement can be altered. A user who has a low level of skill in positioning a pointer device may require more latitude in moving in the second dimension compared to a more skilled user. A configuration can be set for the required movement width of movement which activates the movement of the linked scroll bar.

Improvements and modifications can be made to the foregoing without departing from the scope of the present invention.

The invention claimed is:

1. Method for two-dimensional scrolling in a graphical display window, comprising:

displaying a first scroll bar associated with a display window enabled to move data displayed in the window relative to a first direction;

responsive to user selection of the first scroll bar with a pointer device and without selection of a second scroll bar enabled to move data displayed in the window relative to a second direction which is a different direction than the first direction, responsive to movement of the pointer device in the second direction, moving data displayed in the window relative to the second direction;

wherein the method includes displaying the second scroll bar in the second direction and wherein movement of the pointer device in the second direction in relation to a screen that contains the display window with user selection of the first scroll bar is represented by the position of a slide button in the second scroll bar.

2. A method as claimed in claim 1, wherein the first direction is the direction of the scroll bar and the second direction is perpendicular to the first direction.

3. A method as claimed in claim 1, wherein the user selection of the scroll bar is by selection of a slide button on the scroll bar.

4. A method as claimed in claim 3, wherein the method includes representing the position of the display window in the first direction in a data item being viewed by the position of the slide button in the scroll bar.

5. A method as claimed in claim 1, wherein the user selection of the scroll bar for activating movement in the second direction is different to the user selection of the scroll bar for activating movement in the first direction.

6. A method as claimed in claim 1, including sending movement messages of a pointer device associated with a slider control to a first scroll bar owning the slider control and to a second scroll bar.

7. A method as claimed in claim 6, including sending movement messages to an owning window control to route them to the first and second scroll bars for processing.

8. A computer program product embodied in a computer readable medium for two-dimensional scrolling in a graphical display window, the computer program product comprising the programming instructions for:

displaying a first scroll bar associated with a display window enabled to move data displayed in the window relative to a first direction;

responsive to user selection of the first scroll bar with a pointer device and without selection of a second scroll bar enabled to move data displayed in the window relative to a second direction which is a different direction than the first direction, responsive to movement of the pointer device in the second direction, moving data displayed in the window relative to the second direction; and displaying the second scroll bar in the second direction and wherein movement of the pointer device in the second direction in relation to a screen that contains the display window with user selection of the first scroll bar is represented by the position of a slide button in the second scroll bar.

9. The computer program product as recited in claim 8, wherein the first direction is the direction of the scroll bar and the second direction is perpendicular to the first direction.

10. The computer program product as recited in claim 8, wherein the user selection of the scroll bar is by selection of a slide button on the scroll bar.

11. The computer program product as recited in claim 10 further comprising the programming instructions for:

representing the position of the display window in the first direction in a data item being viewed by the position of the slide button in the scroll bar.

12. The computer program product as recited in claim 8, wherein the user selection of the scroll bar for activating movement in the second direction is different to the user selection of the scroll bar for activating movement in the first direction.

13. The computer program product as recited in claim 8 further comprising the programming instructions for:

sending movement messages of a pointer device associated with a slider control to a first scroll bar owning the slider control and to a second scroll bar.

14. The computer program product as recited in claim 13 further comprising the programming instructions for:

sending movement messages to an owning window control to route them to the first and second scroll bars for processing.

15. A system, comprising:

a memory unit for storing a computer program for two-dimensional scrolling in a graphical display window; and a processor coupled to said memory unit, wherein said processor, responsive to said computer program, comprises:

circuitry for displaying a first scroll bar associated with a display window enabled to move data displayed in the window relative to a first direction;

circuitry for responsive to user selection of the first scroll bar with a pointer device and without selection of a second scroll bar enabled to move data displayed in the window relative to a second direction which is a different direction than the first direction, responsive to movement of the pointer device in the second direction, moving data displayed in the window relative to the second direction; and circuitry for displaying the second scroll bar in the second direction and wherein movement of the pointer device in the second direction in relation to a screen that contains the display window with user selection of the first scroll bar is represented by the position of a slide button in the second scroll bar.

16. The system as recited in claim 15, wherein the first direction is the direction of the scroll bar and the second direction is perpendicular to the first direction.

17. The system as recited in claim 15, wherein the user selection of the scroll bar is by selection of a slide button on the scroll bar.

18. The system as recited in claim 17, wherein said processor further comprises:

circuitry for representing the position of the display window in the first direction in a data item being viewed by the position of the slide button in the scroll bar.

19. The system as recited in claim 15, wherein the user selection of the scroll bar for activating movement in the second direction is different to the user selection of the scroll bar for activating movement in the first direction.

20. The system as recited in claim 15, wherein said processor further comprises:

circuitry for sending movement messages of a pointer device associated with a slider control to a first scroll bar owning the slider control and to a second scroll bar.

21. The system as recited in claim 20, wherein said processor further comprises:

circuitry for sending movement messages to an owning window control to route them to the first and second scroll bars for processing.

* * * * *